Dec. 3, 1940.　　　M. F. BAUER　　　2,223,542
FOOD DICING APPARATUS
Filed Aug. 3, 1939　　　7 Sheets-Sheet 1

Dec. 3, 1940.  M. F. BAUER  2,223,542
FOOD DICING APPARATUS
Filed Aug. 3, 1939  7 Sheets-Sheet 2

INVENTOR.
Michael F. Bauer
BY Harry H. Hitzeman
ATTORNEY.

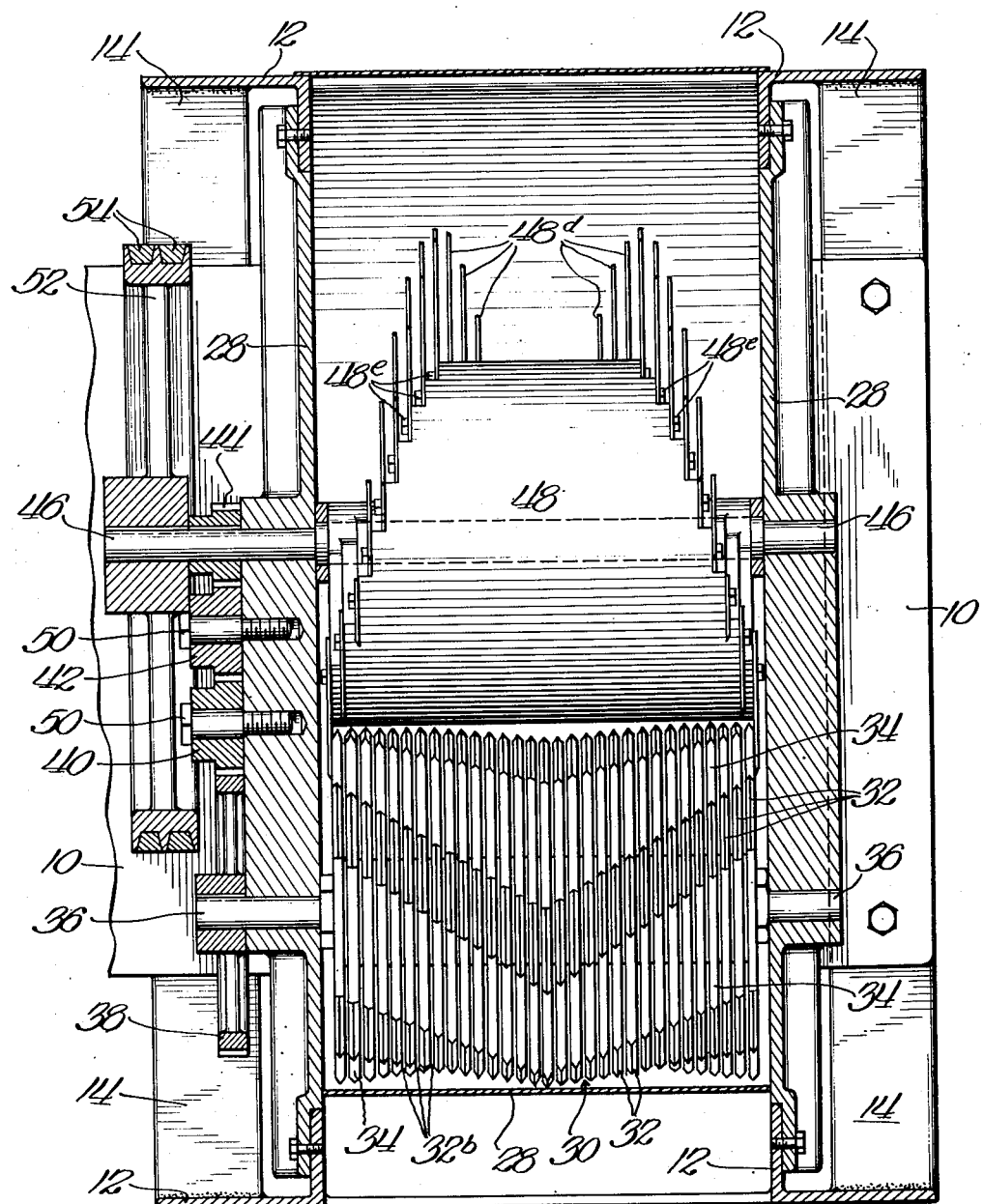

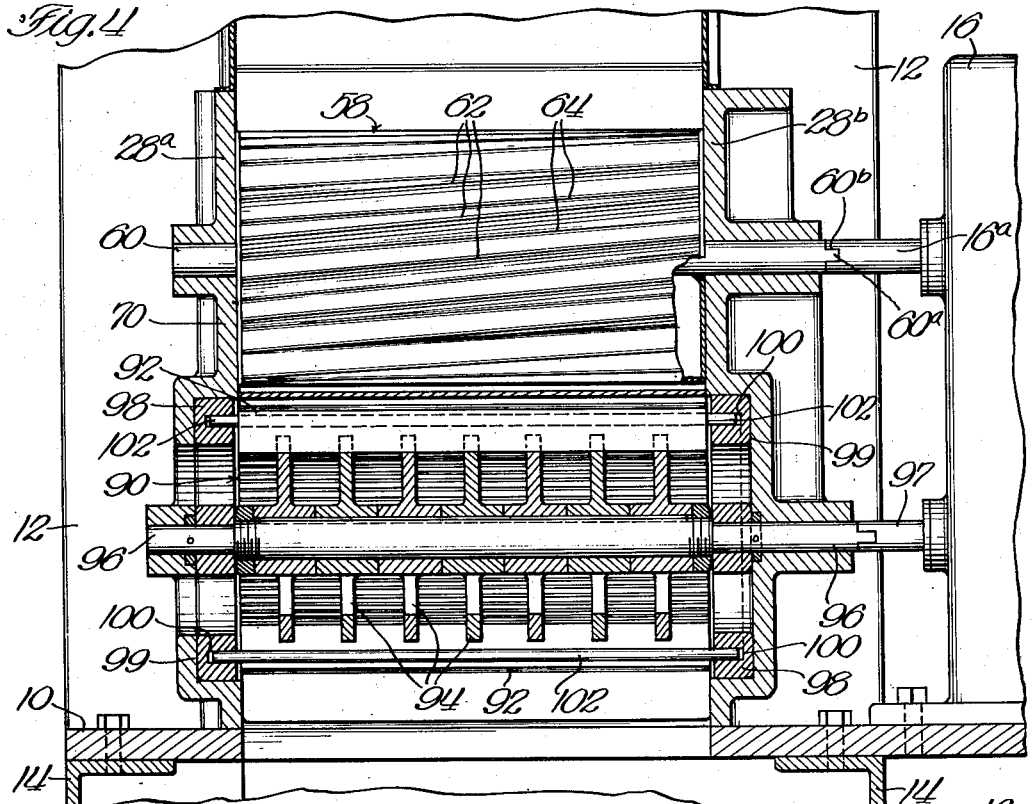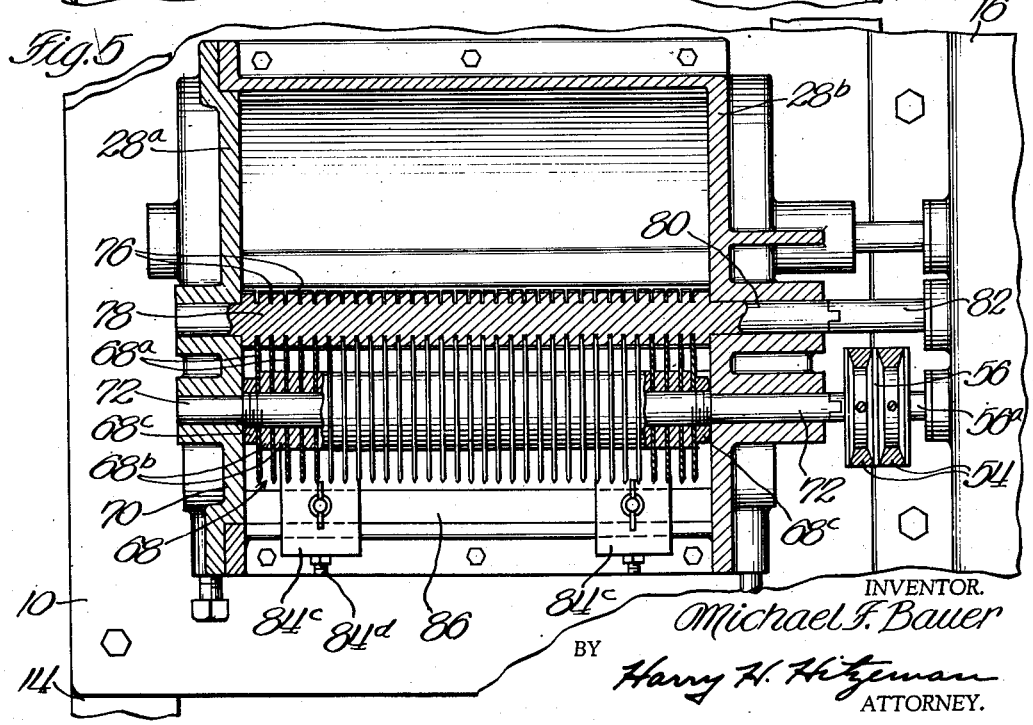

Dec. 3, 1940.        M. F. BAUER         2,223,542
                  FOOD DICING APPARATUS
              Filed Aug. 3, 1939    7 Sheets-Sheet 5
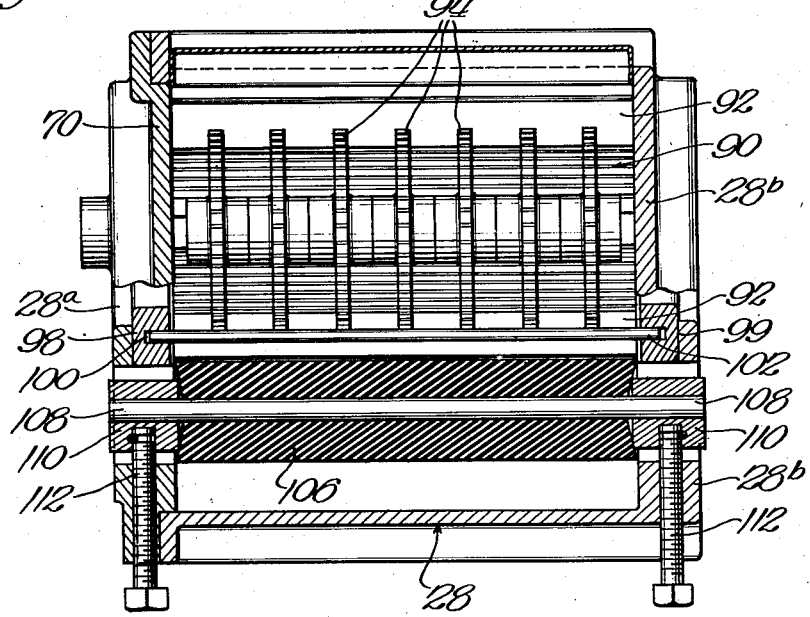
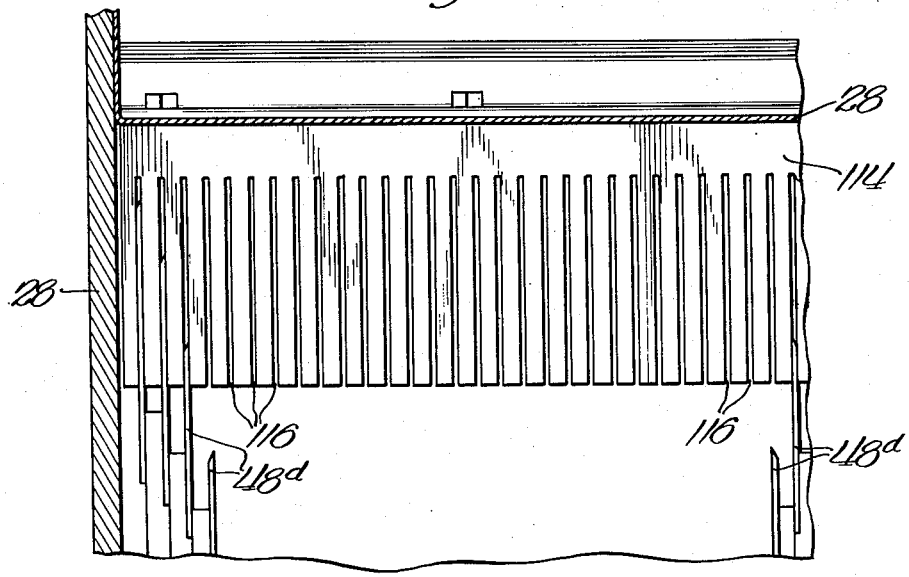
INVENTOR.
Michael F. Bauer
BY Harry H. Hitzeman
ATTORNEY.

Dec. 3, 1940.   M. F. BAUER   2,223,542
FOOD DICING APPARATUS
Filed Aug. 3, 1939   7 Sheets-Sheet 6

INVENTOR.
Michael F. Bauer
BY Harry H. Hitzeman
ATTORNEY.

Patented Dec. 3, 1940

2,223,542

UNITED STATES PATENT OFFICE 2,223,542

FOOD DICING APPARATUS

Michael F. Bauer, Chicago, Ill., assignor to American Utensil Company, a corporation of Illinois Application August 3, 1939, Serial No. 288,149

15 Claims. (Cl. 146—78)

My invention relates to improvements in slicers, dicers, and the like for use in connection with the treatment of vegetables, fruits and other materials prepared in large quantities for canning purposes.

Today almost every type of food stuffs imaginable are prepared and canned for consumption later. Among these products may be mentioned meat products and fruits and vegetables of practically every kind and description. Potatoes, carrots, beets, kohlrabi, parsnips, turnips, rutabagas, onions, peppers, tomatoes, pears, peaches, bananas, apples, pineapples, citron, various meat products and other materials are preserved, sometimes in strips and also in a diced or cubed condition.

In canning factories it is naturally desirable to have machinery which will have large volume and capacity, as when a certain fruit or vegetable is in season it must be preserved. Therefore a machine which has a large capacity is naturally most desirable.

A further object of my invention is to provide an improved method for dicing material whereby the individual articles such as potatoes are dropped from a hopper into pockets which carry them into the path of spaced staggered knives which cut the potato into slices 3/8" thick. The slices drop by gravity upon a revolving corrugated guide which separates them and feeds them through spaced revolving disc knives where they are cut into strips 3/8" square and as long as the original slices. The strips thus obtained are fed downwardly through the above mentioned disc knives and meet horizontally disposed knives so spaced that the strips are cut into 3/8" lengths, after which the 3/8" cubes thus obtained are pushed out from between the cuber knives and dropped into a trough or conveyor to be carried forward to the processing apparatus.

A further object of the present invention is to provide an improved machine of the type described wherein material to be cubed is dropped from a hopper through a plurality of knife assemblies where the material is consecutively sliced, cut into strips and then cubed.

A further object of the present invention is to provide an improved machine of the type described having an improved construction of staggered knives for the initial slicing operation whereby slices of exact thickness throughout are secured.

A further object is to provide in a machine of the type described improved guide means for properly directing slices into cutters for making strips, which guide means are so arranged that the slices are all fed into the cutters in exactly the same way.

A further object is to provide in a machine of the type described improved stripper means for releasing cubes of material from cuber knives as soon as the cubes have been cut.

A further object of my invention is to provide in a machine of the type described an improved dicer knife construction whereby each dice or cube is cleanly and sharply cut and severed from each other one so that no strips of partially separated cubes are obtained.

A further object of my invention is to provide an improved machine of the type described that is easily taken apart and assembled, one that is capable of long and rugged service and will not become easily broken or out of order.

Other objects and advantages will be more apparent from the following description wherein reference is had to the accompanying seven sheets of drawings, upon which Fig. 1 is a front elevational view of my improved dicing machine, a portion of the top and the frame being broken in cross section to more clearly show other parts;

Fig. 3 is a plan sectional view through the upper knives and initial carrier taken generally on the lines 3—3 of Fig. 2;

Fig. 4 is a fragmentary vertical sectional view on an enlarged scale taken through the rotating guide member and dicing knives and is taken generally on the line 4—4 of Fig. 2;

Fig. 5 is a plan sectional view through the rotary guide and slicing knives and is taken generally on the lines 5—5 of Fig. 2;

Fig. 6 is a fragmentary plan sectional view through the dicing knives and platen against which the same operate, and is taken generally on the line 6—6 of Fig. 2;

Fig. 7 is an enlarged fragmentary sectional view through the initial slicing knives and guide comb and is taken generally on the lines 7—7 of Fig. 2;

Figure 1:
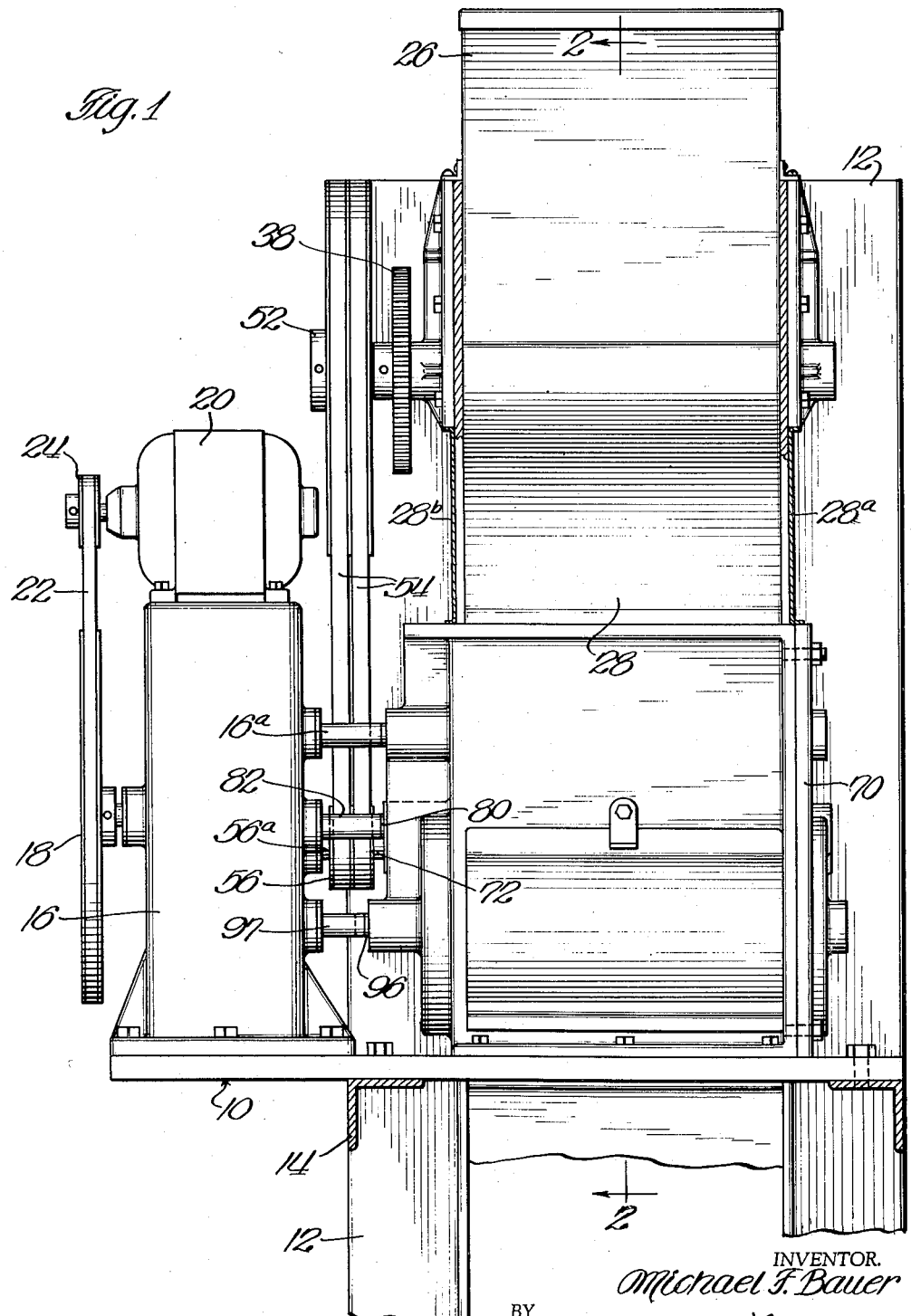

In the embodiments of my invention which I have illustrated, in the drawings in Fig. 1, I have shown a support 10 which may be provided with a plurality of upright leg members 12 and horizontal supports 14. Upon one portion of the platform 10 I provide a gear assembly 16 provided with a pulley 18 which may be driven from a suitable source of power 20 by a belt member 22. In the construction shown, the motor 20 may be positioned on the top of the gear housing casting and drive the belt 22 direct by means of a driving pulley 24. The gear assembly 16 may provide suitable drives for the various knife, drum, guide and platen members which will be hereinafter described, it being further understood that the gearing therein is so arranged that each one of these shafts and their associated elements will be timed and correlated to all of the others.

Figure 2:
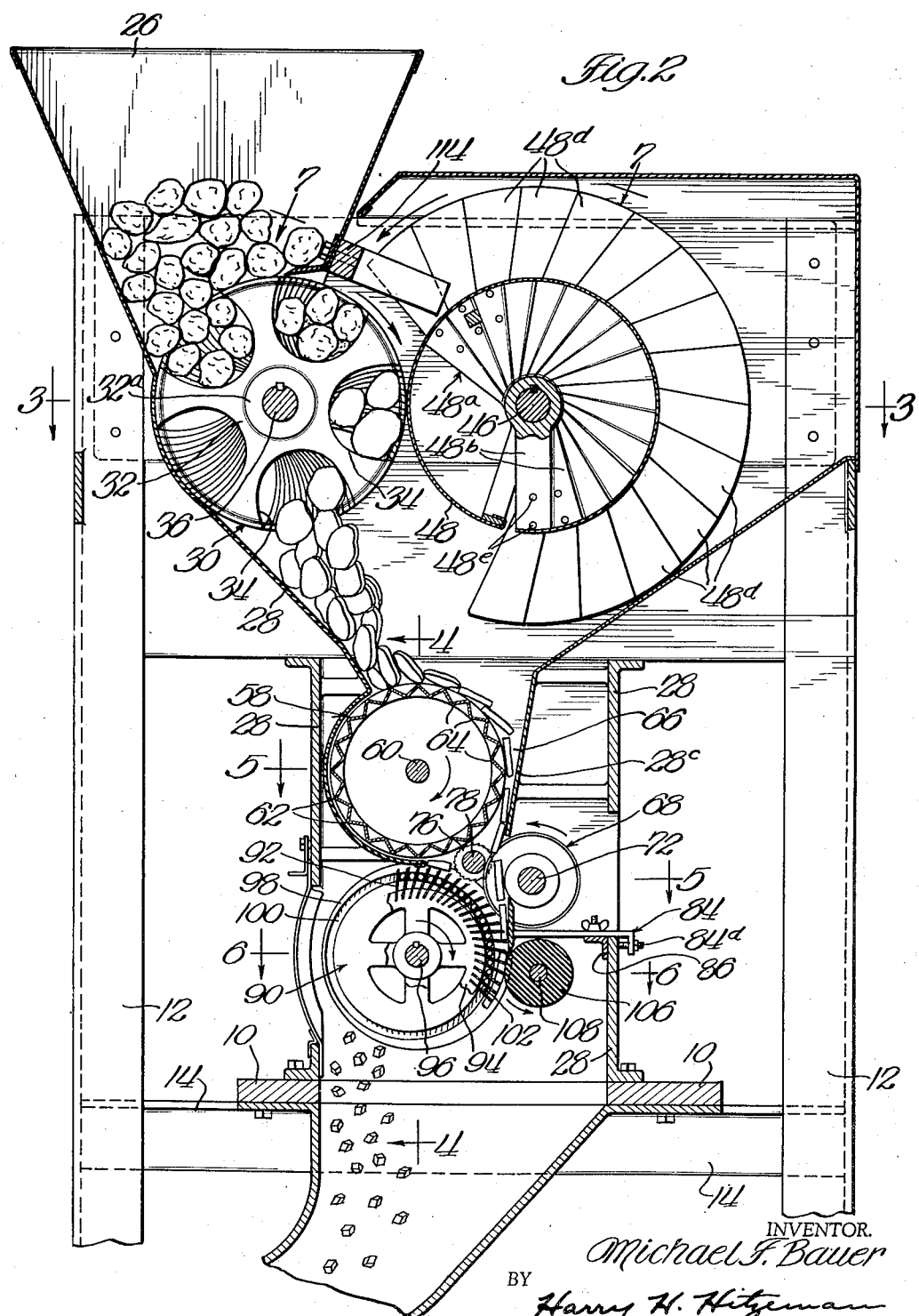
Fig. 2 is a vertical sectional view generally through the center of the machine, taken on the lines 2—2 of Fig. 1.
Figure 8:
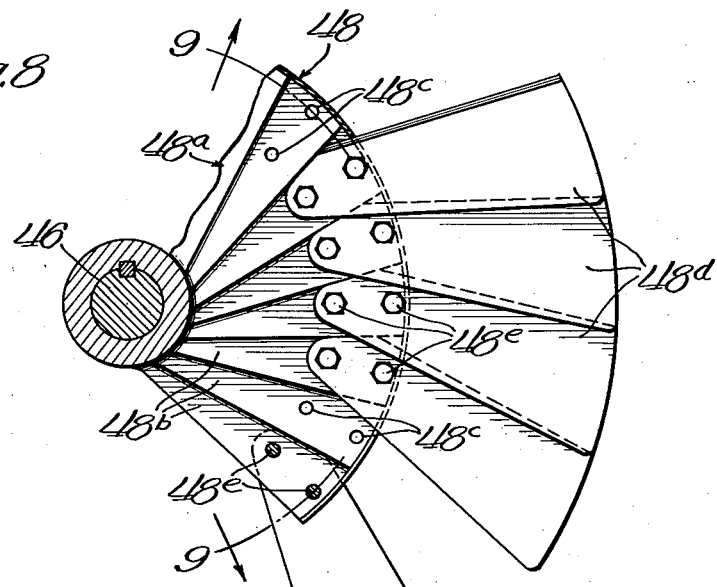
Fig. 8 is a fragmentary detailed view of the slicing knife drum showing the manner in which the individual knives are secured thereto.
Figure 9:
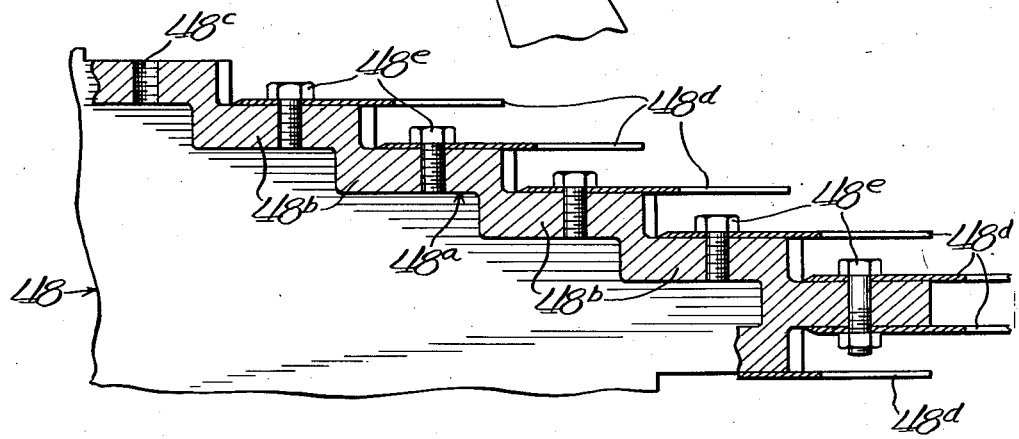
Fig. 9 is a fragmentary cross sectional view of the same parts taken generally on the line 9—9 of Fig. 8.
Figure 10:
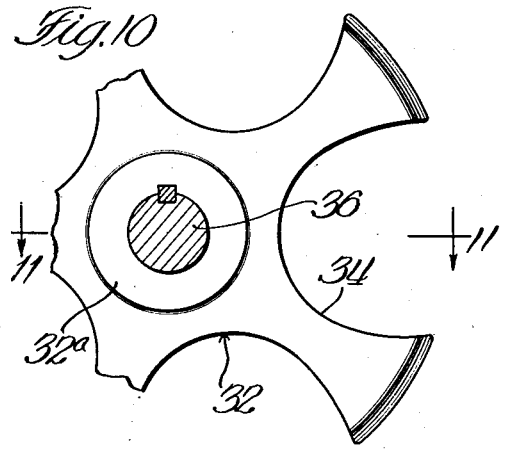
Fig. 10 is an enlarged fragmentary view of one of the discs from which the initial food carrier is constructed.
Figure 11:
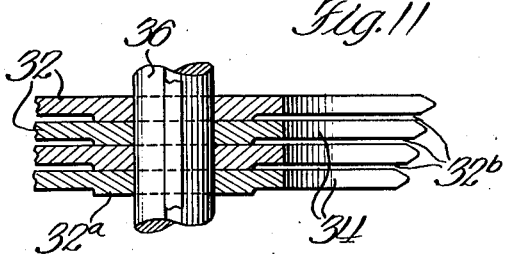
Fig. 11 is an enlarged fragmentary view of the same parts, being generally a section on the line 11—11 of Fig. 10.

Referring to Fig. 2, I have provided a hopper 26 which may have its lower end connected generally to a sheet metal housing 28 that may enclose all of the working parts of the machine. Adjacent the lower end of the hopper 26 I have provided a horizontally disposed revolving carrier 30. The carrier 30 (see Figs. 10 and 11) may be formed of a pluality of disc members 32 provided with a plurality of pockets 34. In the construction which I have shown, five pockets have been provided, but it will be understood that this number may be varied as desired. The disc elements 32 are all keyed to a shaft 36 which has a face gear 38 keyed thereto. The shaft 38 may be driven by means of a pair of pinions 40 and 42 from a pinion 44 mounted upon the drive shaft 46 for the knife carrying drum 48. It will be noted that the pinions 40 and 42 are held against the outside of the housing 28 by means of a pair of shoulder bolt members 50 which form a bearing therefor and at the same time support them in driving relation to the other gear and pinion members.

The disc members 32 (Fig. 11), are formed with annular shoulders 32a about the hub of the shaft 36. With this construction it will be seen that accurate spaces 32b are provided between each of the disc members 32. It will further be noted (Fig. 3) that the pockets 34 are not aligned, but rather are staggered in such a manner that they reach a peak from the edge of both sides of the carrier, the peak being in the center of the same. This is for the purpose of positioning food products in the carrier at different points in the travel of the slicing knives so that at all times there will be a finishing up of one slice by one knife as another knife commences its cutting operation.

The cutter which co-operates with the revolving carrier previously described may comprise the drum 48 which is driven by means of a pulley 52 from the gear housing 16, the drive including a pair of driving belts 54 trained about the pulley 57 and a driving pulley 56 driven from the gear housing 16. The drum 48 may be formed with a supporting casting 48a about a portion of its periphery. The casting 48a may be formed with suitable boss portions 48b adapted to receive screw-threaded openings 48c. A plurality of knife members 48d are adapted to be fastened to the bosses 48b by pairs of set screws 48e which pass through suitable openings in the knife and screw-threadedly engage the openings 48c. In this manner the individual knives may be easily removed and replaced when broken or out of order.

It will be noted that the knives 48d are staggered about the drum 48 in a manner directly relating to the position of the pockets 34, so that the edge knives will engage in the pockets 34 ahead of the time that the middle knives engage in the extreme peak of the pocket 34. In this manner, as previously explained, articles to be sliced will have a slicing action started by one knife and almost finished before the next knife enters, so that at no time will the article to be sliced be subject to the direct action of a large number of knives. This construction provides in effect for each slice a shearing action such as the action of a single knife, and in addition clearly reduces the amount of horse power necessary for a machine of this type. As a further guide for the knives 48d, I provide the comb member 114 positioned so that the knives will pass through the slots 116 at about the same time they enter the spaces 32b, so that the danger of misalignment of knives and slots in the rotary carrier 30 is practically eliminated.

After the article of food such as a potato, has been sliced by the action heretofore explained, the slices will fall by gravity within the housing 28 and land upon a rotatable guide member 58. The guide member 58 may be positioned between the side walls 28a and 28b of the housing 28 and be provided with a driving shaft 60. It will be noted that the guide is constructed of a plurality of ridges 62 and valleys 64 disposed at a diagonal (Fig. 4) across the machine. This is for the purpose of picking up slices that may be dropped upon the guide and moving them forward in a clockwise direction to the vertical passageway 66 between the top of the ridges 62 and the portion 28c of the housing 28. It may be added that it is desirable to pass the slice downwardly to the revolving disc slicer 68 in a vertical position to expedite the stripping operation.

The drive shaft 60 is formed with a key 60a at its end to coincide with a groove 60b in the end of the drive shaft 16a that extends from the gear housing 16. It may be mentioned at this time that all of the shafts in the lower end of the machine are similarly constructed so that the entire assembly can be removed by taking off the housing plate 70 which forms a part of the housing 28. After the slices have been directed downwardly as indicated through the passageway 66, they are fed through the stripping knife member 68. This member may include a drive shaft 72 mounted in suitable journals in the housing 28a and 28b, and have a driving connection as described to a shaft 56a extending from the gear housing 16. The knife member 68 may be constructed of a plurality of disc knives 68a and spacers 68b disposed between the knives. The assembly may be held upon the shaft between a pair of nut members 68c disposed at the two ends of the shaft. The disc knives 68b are adapted to run and be guided in the spaced grooves 76 in a platen 78 which is mounted directly in front of the stripping knife assembly and in such a position that it will tend to feed the slices downward between the disc knives 68a. The platen 78 may be formed integral with a shaft 80 that is driven by a splined connection from a stub shaft 82 extending out of the gear housing 16.

As the slices are fed through the disc knife assembly 68 they pass downwardly and are further guided in a vertical direction by a comb member 84 which is mounted below the knife member 68 upon a bracket 86 supported from the housing 28. The comb member 84 (Figs. 12 and 13) may be provided with suitable teeth 84a and slots 84b to guide the disc knives 68a and at the same time force off the material that has been cut into strips. A means for adjusting the comb back and forth is provided and may include an elongated slot in the supporting brackets 84c and the adjusting bolts 84d.

The strips of material which have not been cut are thus directed downwardly and as they pass vertically along the inside edge of the teeth 84a of the comb, they are grasped by the dicer knife assembly 90.

Figure 12:
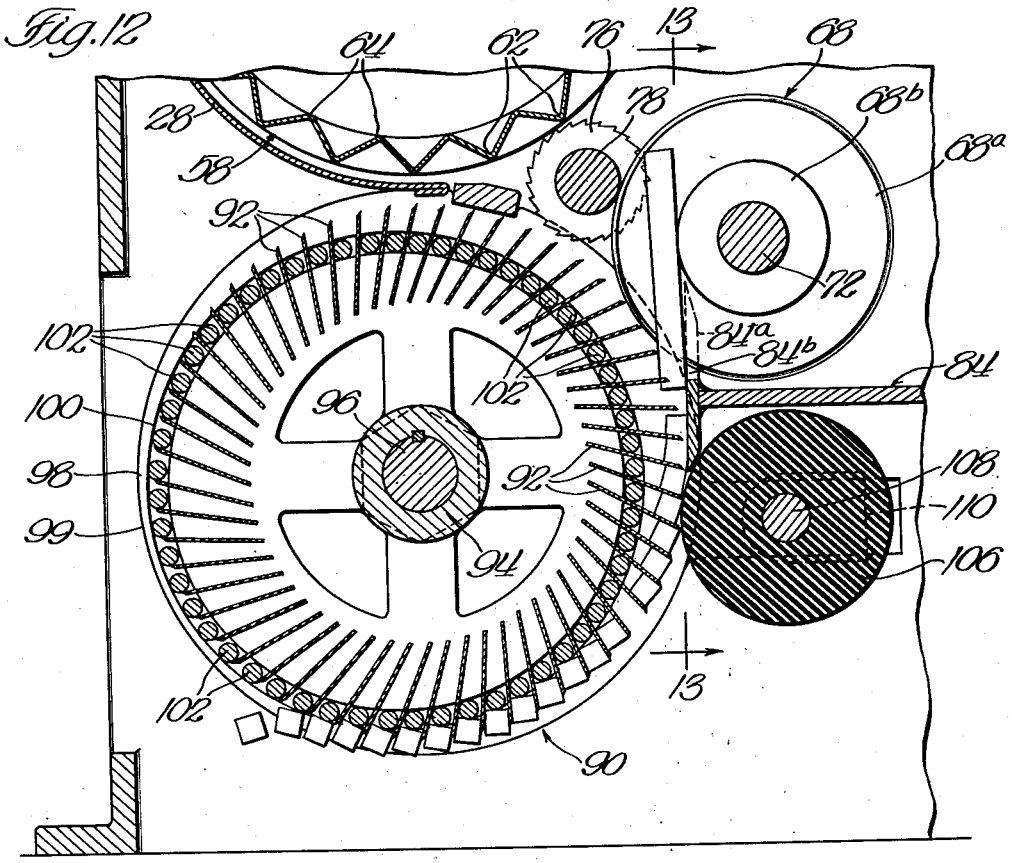
Fig. 12 is enlarged fragmentary view of the dicer knife assembly and associated parts.
Figure 13:
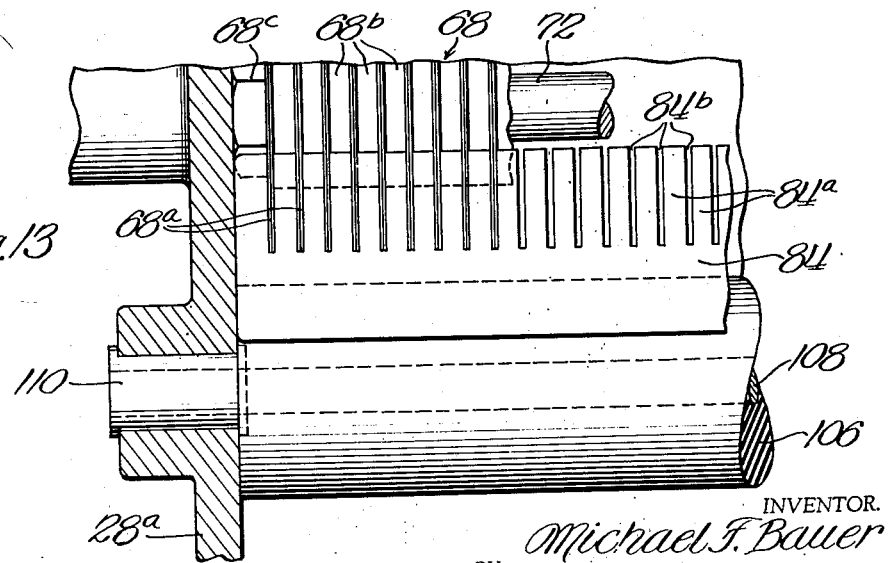
Fig. 13 is a fragmentary sectional view showing the platen and comb associated with the dicer knife assembly and the slicer knife assembly.

The dicer knife may be constructed of a plurality of flat blade members 92 that are supported in a plurality of spider members 94 mounted upon the shaft 96. The shaft 96, similar to the other shafts described, is provided with a splined end to be driven by a shaft 97 extending from the gear housing 16. With the knife members 92 positioned as described within the supporting spiders 94, I provide a pair of cam members 98 in suitable compartments 99 in the housing members 28a and 28b. The cam members 99 may be formed with a face groove 100 within which I mount a plurality of rod members 102. The rod members are positioned between the knife members 92 so that as the dicer knife assembly rotates the rod members therein will follow the track of the cam and as shown in Fig. 12 reach the lowermost point adjacent the bottom of the assembly. In this manner it will be seen that the rods 102 in their movement are pushing outwardly from between the individual knife members any material that may have been cut and is resting between the knives. By reason of the fact that the knives are placed at a diagonal to each other, it will be seen that the movement of the rods 102 dislodges the material that has been cut, and as the knife assembly rotates, the same drop by gravity from the bottom of the assembly.

In order to secure sharp, clean slicing of the material to form perfect cubes or dice, I have provided a platen 106 against which the edge of the knives 92 is pressed during their cutting operation. The platen 106 is preferably formed of rubber or other yieldable material so that the knife may cut into the same to insure a sharp severance of the material being cut. The platen 106 is mounted upon a shaft 108 which is positioned within the housing 28a and 28b and may be provided with a pair of adjustable bearings 110 that are movable back and forth against or away from the knife by suitable adjusting screws 112 mounted in the housings 28a and 28b respectively.

From the above description it will thus be apparent that I have provided a machine within which potatoes, carrots, or other food stuffs previously mentioned may be dumped in the hopper 26. The same are picked up in the pockets 34 of the revolving carrier 30 and brought into the path of the slicer knives 48d. After the article has been cut into slices, the same are dropped by gravity out of the pockets 34 upon the rotating guide member 58 which arranges them and carries them in a vertical plane through the passageway 66 so that they may pass through the stripping knife member 68 in a vertical plane. The comb member 84 continues to guide the strips in a vertical plane so that they are picked up by the revolving dicer knives 90 and cut into dice against the resilient platen 106. After this cutting action has taken place, the rods 102, which move about the cam tracks 100, push the individual dice out from between the dicer knives and they fall by gravity into a conveyor or other suitable receptacle.

The construction which I have provided, which includes the removable housing portion 28a, permits the removal of the revolving guide 58, the stripper knife assembly 68, the platens 78 and 106, and the dicer knife assembly 90. Due to the splined shaft drive for these parts, it can be seen that when any one of them becomes broken or out of order it may be easily removed, repaired and replaced without causing much delay in the operation of the machine.

From the above and foregoing description it will be apparent to those skilled in the art that I have provided a machine and a method for securing diced products which is comparatively fast in operation and capable of acting upon a large volume of food products in a continuous manner. While I have illustrated and described a specific embodiment of the invention, it will be apparent to those skilled in the art that changes and modifications may be made in the exact details shown, and I do not wish to limit myself in any particular; rather what I desire to secure and protect by Letters Patent of the United States is:

1. Apparatus of the class described including a housing, a hopper for material to be diced, a revolving member having pockets to carry material forward from said hopper, a revolving drum having knives thereon, said knives passing through said pockets to slice the material therein, a revolving corrugated guide below said revolving member adapted to direct slices of material downwardly in a vertical plane, a slicing disc below said guide for cutting the vertically disposed slices into strips and a rotating knife member therebelow for cutting the strips of material into cubes, said knife member operating against a resilient platen, and means associated with said rotating knife member for discharging the cubes therefrom.

2. Apparatus of the class described including a housing, a hopper for material to be diced, a revolving member having pockets to carry material forward from said hopper, a revolving drum having knives thereon, said knives passing through said pockets to slice the material therein, a revolving corrugated guide below said revolving member adapted to direct slices of material downwardly in a vertical plane, a slicing disc below said guide for cutting the vertically disposed slices into strips and a rotating knife member therebelow for cutting the strips of material into cubes, said knife member operating against a resilient platen, and means associated with said rotating knife member for discharging the cubes therefrom, said means including rods placed between individual knives and capable of moving outwardly therebetween.

3. Apparatus of the class described including a housing, a hopper for material to be diced, a revolving member having pockets to carry material forward from said hopper, said pockets formed by a plurality of spaced discs, a revolving drum having equally spaced knives thereon, said knives passing between said discs through said pockets to slice the material therein, a revolving corrugated guide below said revolving member adapted to direct slices of material downwardly in a vertical position, a slicing disc below said guide for cutting the vertically disposed slices into strips and a rotating knife member therebelow for cutting the strips of material into cubes, and means associated with said rotating knife member for discharging the cubes therefrom.

4. Apparatus of the class described including a housing, a hopper for material to be diced, a revolving member having pockets to carry material forward from said hopper, said pockets formed by a plurality of spaced discs, a revolving drum having equally spaced knives thereon, said knives passing between said discs through said pockets to slice the material therein, a revolving corrugated guide below said revolving member adapted to direct slices of material downwardly in a vertical position, a slicing disc below said guide for cutting the vertically disposed slices into strips and a rotating knife member therebelow for cutting the strips of material into cubes, and means associated with said rotating knife member for discharging the cubes therefrom, said means including rods placed between individual knives and capable of moving outwardly therebetween.

5. In apparatus of the class described, the combination of a revolving carrier having a plurality of pockets therein, said carrier formed from spaced discs, a revolving knife member comprising a drum having a plurality of radially directed blade members, said blade members adapted to pass between said discs during a portion of their rotary movement thereby slicing material in said pockets and permitting the slices to drop by gravity, a revolving guide member below said carrier, upon which said slices are dropped, a vertical wall on one side thereof, said guide member adapted to carry said slices against said wall where they drop by gravity, a plurality of rotating disc knives below said guide and vertical wall, for cutting said slices into strips, and a rotating cutter member positioned below said disc knives for cutting the strips into cubes.

6. In apparatus of the class described, the combination of a revolving carrier having a plurality of pockets therein, said carrier formed with spaced discs, a revolving knife member adapted to pass between said discs during a portion of its rotary movement thereby slicing material in said pockets and permitting the slices to drop by gravity, a revolving guide member below said carrier upon which said slices are dropped, a vertical wall on one side thereof, said guide member adapted to carry said slices against said wall where they drop by gravity, a plurality of rotating disc knives below said guide and vertical wall for cutting said slices into strips and a rotating cutter member positioned below said disc knives for cutting said slices into cubes and means associated with said cutter member for expelling material that has been cubed therefrom.

7. In apparatus of the class described, the combination of a horizontally disposed revolving carrier having a plurality of pockets therein, said carrier formed from vertically positioned spaced discs, a horizontally disposed revolving knife member having blades adapted to pass between said discs during a portion of its rotary movement, thereby slicing material in said pockets and permitting the slices to be dropped therefrom, a horizontally disposed revolving guide member below said carrier upon which said slices fall, a vertical wall on one side thereof against which said guide member moves said slices and whereby they may fall in a vertical plane, a plurality of vertically positioned rotating disc knives below said guide and vertical wall for cutting said slices into strips, a horizontally disposed rotating cutter member positioned below said disc knives for cutting said strips into cubes and means associated with said cutter member for expelling material that has been cubed therefrom.

8. Apparatus of the class described including a housing, a hopper for material to be diced, a revolving member having pockets to carry material forward from said hopper, a revolving drum having radially directed spaced knives thereon, said knives passing through said pockets to slice the material therein, a revolving corrugated guide below said revolving member, the corrugations thereon adapted to move over to one side and direct slices of material downwardly in a vertical plane, a slicing disc below said guide for cutting the vertically disposed slices into strips and a rotating knife member therebelow for cutting the strips of material into cubes.

9. A machine for treating food products including a horizontally disposed revolvable carrier, a horizontally disposed rotatable knife member adapted to cooperate therewith and cut objects therein into slices, said carrier having open-ended pockets from which said slices may drop by gravity, means directly below said knife member and said carrier for guiding said slices in a vertical plane, vertically disposed spaced disc knife means for cutting said slices while in a vertical plane into strips, and other knife means directly therebelow for cutting said strips while in a vertical plane into cubes, said last mentioned knife means having means associated therewith for forcibly expelling cubes therefrom.

10. In apparatus of the class described, the combination of a hopper, a housing therebeneath, a horizontally disposed revolving carrier mounted in said housing below said hopper, said carrier formed of a plurality of spaced disc members, each of said disc members having a plurality of pockets therein, said disc members adapted to be keyed to an axial shaft with said pockets so positioned that in the carrier they form a V-shaped pocket, a cutter member adapted to cooperate with said carrier, said cutter member comprising a drum having an axial shaft therethrough for supporting the same in a horizontal position, individual knife members secured upon said drum staggered about the same in such manner that in rotating through the pockets of the carrier the edge knives will engage in the pockets ahead of the time that the middle knives engage in the inside pockets whereby a shearing action is obtained in making each individual cut.

11. In apparatus of the class described the combination of a hopper, a housing therebeneath, a horizontally disposed revolving carrier mounted in said housing below said hopper, said carrier formed of a plurality of spaced disc members, each of said disc members having a plurality of pockets therein, said disc members adapted to be keyed to an axial shaft with said pockets so positioned that in the carrier they form a V-shaped pocket, a cutter member adapted to cooperate with said carrier, said cutter member comprising a drum having an axial shaft therethrough for supporting the same in a horizontal position and individual knife members secured upon said drum and staggered about the same.

12. In apparatus of the class described the combination of a hopper, a housing therebeneath, a horizontally disposed revolving carrier mounted in said housing below said hopper, said carrier formed of a plurality of spaced disc members, each of said disc members having a plurality of pockets therein having an open end at the periphery of the disc member, said disc members adapted to be keyed to an axial shaft with said pockets so positioned that in the carrier they form a V-shaped pocket, a cutter member adapted to cooperate with said carrier, said cutter member comprising a drum having an axial shaft therethrough for supporting the same in a horizontal position, individual knife members secured upon said drum spaced apart to pass through said V-shaped pockets between said disc members and staggered about said drum in such manner that in rotating through the pockets of the carrier the edge knives will engage in the pockets ahead of the time that the middle knives engage in the middle pockets, whereby a shearing action is obtained in making each individual cut.

13. In apparatus of the class described the combination of a hopper, a housing therebeneath, a horizontally disposed revolving carrier mounted in said housing below said hopper, said carrier formed of a plurality of spaced disc members, each of said disc members having a plurality of pockets therein, an axial shaft for supporting said disc members, a cutter member adapted to cooperate with said carrier, said cutter member comprising a drum having an axial shaft therethrough for supporting the same in a horizontal position, individual knife members secured upon said drum staggered about the same in such manner that in rotating through the pockets of the carrier the edge knives will engage in the pockets ahead of the time that the middle knives engage in the middle pockets whereby a shearing action is obtained in making each individual cut.

14. In apparatus of the class described the combination of a hopper, a housing therebeneath, a horizontally disposed revolving carrier mounted in said housing below said hopper, said carrier formed of a plurality of spaced disc members, each of said disc members having a plurality of pockets therein, said disc members adapted to be keyed to an axial shaft with said pockets so positioned that in the carrier they form a V-shaped pocket, a cutter member adapted to cooperate with said carrier, said cutter member comprising a drum having an axial shaft therethrough for supporting the same in a horizontal position, individual knife members secured upon said drum and staggered about the same, and a comb member positioned in said housing adjacent said hopper having slots therein for guiding the knife members between the disc members.

15. In apparatus of the class described, the combination of a revolving carrier having a plurality of pockets therein, said carrier formed from spaced discs, a revolving knife member comprising a drum having a plurality of radially directed blade members, said blade members adapted to pass between said discs during a portion of their rotary movement thereby slicing material in said pockets and permitting the slices to drop by gravity, a revolving guide member below said carrier, upon which said slices are dropped, a vertical wall on one side thereof, said guide member adapted to carry said slices against said wall where they drop by gravity, a plurality of rotating disc knives below said guide and vertical wall for cutting said slices into strips, a rotating cutter member positioned below said disc knives for cutting the strips into cubes, and a resilient roller frictionally disposed against the cutting edges of said rotating cutter member whereby the cutting edges may cut through material passing through and slightly into the roller to secure a sharp severance of the material.

MICHAEL F. BAUER.